March 26, 1963     D. E. CLAPP     3,083,287
COOKING TEMPERATURE CONTROL APPARATUS
Filed Aug. 8, 1956
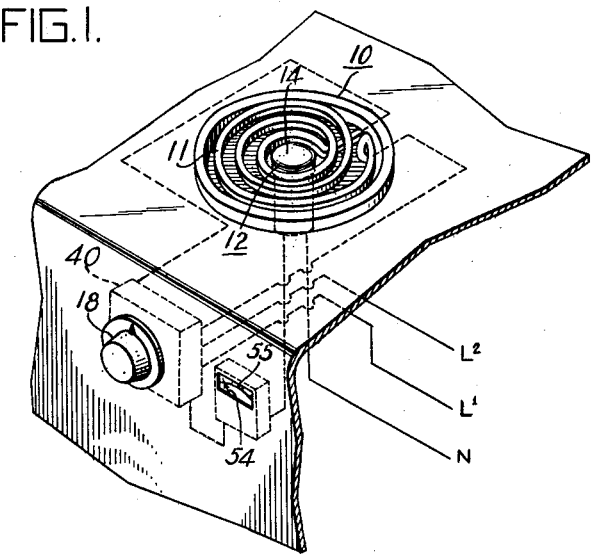
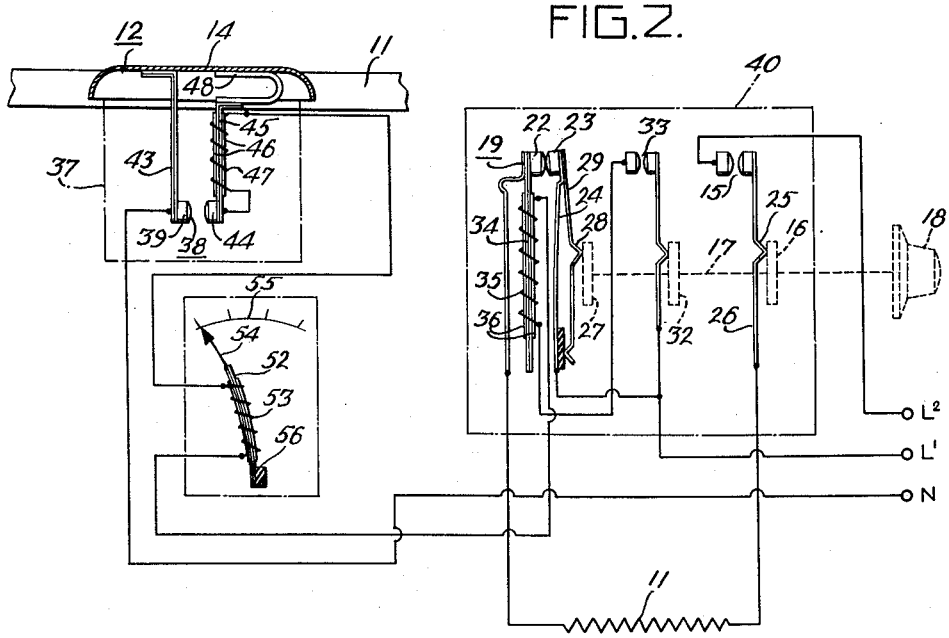
INVENTOR:
DANIEL E. CLAPP
BY *Howson & Howson*
ATTYS.

3,083,287
COOKING TEMPERATURE CONTROL APPARATUS
Daniel E. Clapp, Somerton, Philadelphia, Pa., assignor to The Proctor-Silex Corporation, a corporation of Pennsylvania
Filed Aug. 8, 1956, Ser. No. 602,824
10 Claims. (Cl. 219—20)

This invention relates to the control of cooking temperatures. It is concerned primarily with control of the heating units of an electric range, and more particularly with the heating of vessels placed upon the electric surface unit heaters of such a range, to heat such vessels rapidly and to maintain them for a desired length of time at a substantially uniform cooking temperature.

While the conditions which determine the usefulness of an apparatus of this kind are either obvious or easily deducible, commercially available apparatus has fallen short of attainment of these conditions in important particulars. The apparatus should provide a control by which the vessel and its contents may be heated rapidly to the desired cooking temperature, and thereafter maintained at that temperature with only minor fluctuations. Such preliminary heating and control should be obtained and maintained regardless of wide variations in the heat capacity and other characteristics of the mass to be controlled, i.e., they should be the result of automatic operation regardless of the nature of the cooking vessel and regardless of the cooking load as established by the quantity and nature of its contents. It is obviously desirable that the vessel and contents be brought as rapidly as possible to the desired temperature level, but it is equally obvious that such rapid preliminary heating be not attained at the expense of drastic overshooting and/or undershooting in attempting to establish the desired subsequent control.

When we consider that the apparatus should perform in this manner with both extremely light and very heavy cooking loads, and that it is subject to error because of heat which is irrelevant to that desired to be controlled, it becomes apparent that such an apparatus, to be successful, must meet very exacting requirements with great versatility. The basic object of the present invention has been to provide an apparatus by which such a control is established.

A further object of the invention has been to provide an apparatus of this kind which is simple and economical, and yet fully reliable in operation. A primary object of the invention has been to provide an apparatus which is sensitive not only to the temperature of the bottom wall of the vessel but also to the heat capacity of the vessel contents, so as to give an effective response to this combination of factors.

Still further objects and advantages and the manner in which they have been attained will be evident from reading of the following detailed description in the light of the attached drawing, in which, FIGURE 1 is a perspective view of a portion of an electric range, showing a surface unit to which the present invention has been applied in its simplest form, FIGURE 2 is a view, partly in section, partly in elevation and partly diagrammatic, illustrating the circuit connections which may be used advantageously in practice of the invention with the apparatus more generally illustrated in FIGURE 1.

The range to be controlled may include a plurality of electric resistance surface heater units 10, and these surface heater units may comprise electric heaters 11 which supply the cooking heat by their resistance and are interconnected in the cooking load circuit through terminals $L^1$ and $L^2$.

The detector and control units of the present invention may be applied to one or more of the surface units as may be desired, and these units are applied to each surface unit which is to be so controlled. Each detector unit 12 may be protected from the influence of extraneous heat from unit 11 by the features of the prior patent to Turner, 2,699,487, and heat is directly transmitted from the vessel to the detecting apparatus through a central, yieldably-mounted, metallic disc 14 upon which the vessel rests.

By reference to FIGURE 2 it will be seen that the load circuit through the electric heater 11 extends from line terminal $L^2$ through an on-off switch 15 controlled by cam 16 mounted upon shaft 17 and movable to make or break the load circuit in response to the setting of a control knob 18. From switch 15 the circuit passes through the electric heater 11 constituting the unit by which the vessel is heated, and through switch 19 including contacts 22 and 23 to switch arm 24 and thence to terminal $L^1$. The control knob 18 serves, when moved to any position in which it operates through cam 16 and cam follower 25 on arm 26 to close switch 15, to simultaneously operate cam 27, and this acts against follower 28 of arm 29 to force contact 23 into resiliently overclosed relationship to contact 22 of switch 19. In addition to cams 16 and 27, shaft 17 also carries a cam 32 which operates to close the contacts of an on-off switch 33 in a pilot circuit, similarly and simultaneously to closure of switch 15.

The assembly including switches 15, 19 and 33 is contained within a housing 40, and this assembly may be called a "receiver," since it receives and processes information derived from the detector unit 12, in controlling the operation of the cooking range. The arm of switch 19 which carries contact 22 is a bi-metal member in the form of a strip or arm 34 having its lower end fixed and its upper end movable in response to flexing of the bimetal to cause movement of contact 22 away from contact 23 to open switch 19 upon heating of bimetal 34, and reverse movement to close the switch upon cooling of the bimetal. The temperature of bimetal 34 required to open switch 19 will depend upon the extent of overclosure of contact 23 against contact 22, and this will be a function of the position of cam 27 as controlled by the temperature setting of knob 18.

An electric resistance heating coil 35 forming part of the pilot circuit controlled by switch 33 surrounds bimetal arm 34, and a covering 36 of mica, asbestos and/or other electrical insulating material is preferably provided within coil 35 on opposite sides of bimetal 34.

The shielding of the detector unit is indicated diagrammatically at 37, and this member includes a detector switch 38 including a contact 39 mounted upon the lower end of a bimetal member 43 in the form of an arm or strip having its upper end secured in good heat conducting relationship to the under side of the metal disc or medallion 14 upon which the pan or vessel rests. In view of this excellent heat conductivity path, bimetal arm 43 will respond quickly to any increase in vessel temperature by flexing in a direction to move contact 39 to the right, since its high expansion side is to the left. The opposing contact 44 of detector switch 38 is also mounted upon the lower end of a bimetal member in the form of arm 45 which may have electrical insulating material 46 secured against its opposite faces, as in the case of the receiver switch arm 34.

Arm 45 is surrounded by an electric heating coil 47 forming a part of the pilot circuit including coil 35. This arm is mounted out of direct heat conducting relationship with the heat sensing medallion 14, and is protected against sudden flow of heat therefrom by being mounted on the lower end of a U-shaped arm 48 of poor heat conductivity, which is interposed between the bottom of disc 14 and the upper end of bimetal 45. The arm 48 is preferably a member of high thermal inertia and may be made of ceramic material, stainless steel or other material having the desired heat transfer retarding properties.

A fourth bimetal arm 52 is preferably secured for flexing movement within a further electric resistance heating coil 53, and this arm carries an indicating arm 54 on its free end adapted to register on dial 55 the degree of flexure of arm 52 about its rigidly supported lower end 56.

Since the high expansion sides of each of bimetal arms 43 and 45 are to the left, heating of arm 43 will move the free end of this arm to the right; i.e., in a direction to close switch 38, while the heating of arm 45 will move this arm similarly to the right i.e., in a direction to open the contacts. The high expansion side of arm 34, on the other hand, is to the right, and the heating of this arm will accordingly move contact 22 of switch 19 to open position when this heating reaches a point sufficient to offset the initial overclosure of switch contact 23 against contact 22 as determined by the setting of knob 18.

While contacts 44 and 39 may vary somewhat in their initial setting, we will assume that they are positioned by the initial calibration of the apparatus in a position in which switch 38 is open as the result of a slight degree of separation of these contacts. They may actually be closed or even more widely open in this initial cold setting, within the fundamental principles of operation of the invention.

In operation, the switch 38 open as discussed above, and with a cooking vessel and contents on the unit 10, the knob 18 will be turned to the desired temperature setting, thereby closing each of switches 15 and 33 and overclosing switch 19 to a degree which will provide and maintain the desired cooking vessel temperature in the resulting automatic operation. The load circuit from terminal L² through switch 15, electric heater 11 and switch 19 and arm 24 to terminal L¹ will thus be established, to heat the vessel and contents. The pilot circuit will not, however, be established under the conditions indicated, for switch 38 will be open.

As the cooking operation progresses, the bimetal arm 43 will receive heat through disc 14 from the bottom of the vessel, and switch 38 will close at a vessel temperature depending upon its initial setting. This closure establishes the pilot circuit from terminal L¹ through switch 33, coil 35, coil 53, coil 47 and switch 38 to terminal N, thus heating both of arms 45 and 34 to cause them to move toward positions to open their respective switches. Under most loads and temperature settings, arm 45 will be moved sufficiently to open switch 38 before arm 34 has been heated to a point sufficient to open switch 19. It should be noted therefore that the main load circuit will remain closed and the cooking heat through heater 11 will be applied continuously until switch 19 is opened.

As cooking heat continues, contact 39 will move further and further to the right, but when this results in closure of switch 38, contact 44 will be moved to the right as the result of heating of its bimetal arm 45 by coil 47, so that closure of the pilot circuit through switch 38 will continue only until contact 44 recedes sufficiently to escape its closure by contact 39. In the meantime, contact 22 of switch 19 will have moved somewhat to the left under the heat derived from pilot circuit heater 35.

As the pilot circuit now reopens, contact 44 will move to the left as the result of cooling of arm 45, and contact 39 will continue to move to the right under the increasing temperature of the vessel. The pilot circuit will thus be reestablished and the heating of bimetal arm 34 will therefore be continued intermittently until this arm carrying contact 22 flexes sufficiently to the left to open the circuit through load heater 11, and temporarily interrupt the heating operation. This does not open the pilot circuit automatically, but it rapidly diminishes or reverses the movement of contact 39 to the right, with the result that the pilot circuit is interrupted and bimetal 34 cooled to again close the load circuit. That circuit will then be intermittently opened and closed by the interacting effect of the coils 35 and 47, electric heater 11 and associated bimetal arms, until the desired vessel temperature is attained and maintained.

Since the arm 48 furnishes an insulating or heat transfer retarding path between disc 14 and bimetal 45, this bimetal serves primarily for interrupting the pilot circuit and as an ambient temperature compensator. The system is in any case designed to cause arm 43 to override arm 45 and close the pilot circuit intermittently as discussed above.

When bimetal 43 is receiving heat through disc 12 from the bottom of the vessel, bimetal 45 is also receiving heat through arm 48, but at a reduced rate because of the poor heat conductivity of arm 48. For this reason, when bimetal 43 is moving contact 39 to the right, bimetal 45 is also moving contact 44 to the right at a lesser rate. The distance that contact 44 moves before being overtaken by contact 39 depends on the rapidity with which contact 39 moves. This motion is relatively slow when a vessel of high thermal capacity is being brought up to a preselected temperature, while it is relatively rapid with a vessel of low thermal capacity. In the former case, the greater time required for bimetal 43 to reach a given temperature permits contact 44 to escape engagement with contact 39 for a longer time than in the latter case, resulting in the contact being in closed position a smaller percentage of the time. Therefore, as the thermal capacity of the vessel and its contents is increased, a higher and higher temperature is required before the initial opening of switch 19. This is exactly the relationship needed for efficient operation, for it is desirable to prevent overshooting by starting the cycling of the heating energy for light loads substantially short of the temperature desired, while with heavy loads it is desirable in the interest of rapid heating to supply the heat continuously until the desired temperature is much more closely approached than with lighter loads. With such heavier loads this can be done without incurring undesirable overshooting.

Since the current passing through coil 53 flows in a circuit which also includes coil 47, the position of indicator 54 serves as a direct reading of the temperature of the cooking vessel.

While the features of the invention have unique importance in connection with control of vessel temperatures on surface heater units, they are also useful in other types of cooking control. Instead of using the load circuit for direct energization of an electric resistance heater, it may be used in known fashion to control a gas heater. Since many modifications and refinements of the invention are available within its generic scope, I wish it to be understood that this invention is not to be limited in interpretation except by the scope of the following claims.

I claim:

1. In control apparatus for the energization of a cooking range, the combination comprising a support for a cooking vessel, an energy-supplying heating unit for a vessel mounted upon said support, a switch including a bimetal member mounted beneath the supported position of a cooking vessel in heat exchange relation therewith for sensing the temperature to which the vessel is heated by said unit, a switch contact carried by said bimetal member and movable toward switch-closing position in response to heating thereof, said switch including a second bimetal member carrying a contact for coaction with said first switch contact and movable away from switch-closing position in response to heating thereof, said second bimetal member being mounted in poor heat conducting relationship to the supported cooking vessel position, a load circuit providing energization of the heating unit, a second switch remotely located from said first switch and included in said load circuit, said second switch including a contact mounted upon a third bimetal member for movement into switch-closing position against its associated switch contact upon cooling of said third bimetal member and into switch-opening position upon heating thereof, a pilot circuit including said first switch, and electric resistance heater means in said pilot circuit mounted in heat exchange relationship to said second and third bimetal members.

2. In control apparatus for the energization of a cooking range, the combination comprising an energy-supplying heating unit for supplying cooking heat, a switch including a bimetal member mounted in heat exchange relationship to temperature produced by the range for sensing thereof, a switch contact carried by said bimetal member and movable toward switch-closing position in response to heating thereof, said switch including a second bimetal member mounted in poor heat exchange relationship to temperature produced by the range and carrying a contact for coaction with said first switch contact and movable away from switch-closing position in response to heating thereof, a load circuit providing energization of the heating unit, a second switch remotely located from said first switch and included in said load circuit, said second switch including a contact mounted upon a third bimetal member for movement into switch-closing position against its associated switch contact upon cooling of said third bimetal member and into switch-opening position upon heating thereof, a pilot circuit including said first switch, and electric resistance heater means in said pilot circuit mounted in heat exchange relationship to said second and third bimetal members.

3. A control apparatus as defined in claim 2, in which each of said bimetal members is in the form of a flexible arm.

4. A control apparatus as defined in claim 3, in which said electric resistance heater means comprise heater coils respectively surrounding said bimetal arms.

5. In control apparatus for the energization of a cooking range, the combination comprising an energy-supplying heating unit for supplying cooking heat, a switch including a bimetal member mounted in heat exchange relationship to temperature produced by the range for sensing thereof, a switch contact carried by said bimetal member and movable toward switch-closing position in response to heating thereof, said switch including a second bimetal member carrying a contact for coaction with said first switch contact and movable away from switch-closing position in response to heating thereof, a load circuit providing energization of the heating unit, a second switch remotely located from said first switch and included in said load circuit, said second switch including a contact mounted upon a third bimetal member for movement into switch-closing position against its associated switch contact upon cooling of said third bimetal member and into switch-opening position upon heating thereof, a pilot circuit including said first switch, electric resistance heater means in said pilot circuit mounted in heat exchange relationship to said second and third bimetal members, a fourth bimetal member carrying a temperature indicating member, and further electric resistance heater means in said pilot circuit mounted in heat exchange relationship to said fourth bimetal member.

6. A control apparatus as defined in claim 5, in which each of said bimetal members is in the form of a flexible arm, and in which said electric resistance heater means comprise heater coils respectively surrounding said second, third and fourth bimetal members.

7. In control apparatus for the energization of a cooking range, the combination comprising an electric heater for supplying cooking heat, a switch including a bimetal member mounted in heat exchange reflationship to temperature produced by the range for sensing thereof, a switch contact carried by said bimetal member and movable toward switch-closing position in response to heating thereof, said switch including a second bimetal member mounted in poor heat exchange relationship to temperature produced by the range and carrying a contact for coaction with said first switch contact and movable away from switch-closing position in response to heating thereof, a load circuit providing energization of the electric heater, a second switch remotely located from said first switch and included in said load circuit, said second switch including a contact mounted upon a third bimetal member for movement into switch-closing position against its associated switch contact upon cooling of said third bimetal member and into switch-opening position upon heating thereof, a pilot circuit including said first switch, and electric resistance heater means in said pilot circuit mounted in heat exchange relationship to said second and third bimetal members.

8. In control apparatus for the energization of a cooking range, the combination comprising a support for a cooking vessel, an electric heater for a vessel mounted upon said support, a switch including a bimetal member mounted beneath the supported position of a cooking vessel in heat exchange relation therewith for sensing the temperature to which the vessel is heated by said electric heater, a switch contact carried by said bimetal member and movable toward switch-closing position in response to heating thereof, said switch including a second bimetal member carrying a contact for coaction with said first switch contact and movable away from switch-closing position in response to heating thereof, said second bimetal member being mounted in poor heat conducting relationship to the supported cooking vessel position, a load circuit providing energization of the electric heater, a second switch remotely located from said first switch and included in said load circuit, said second switch including a contact mounted upon a third bimetal member for movement into switch-closing position against its associated switch contact upon cooling of said third bimetal member and into switch-opening position upon heating thereof, a pilot circuit including said first switch, and electric resistance heater means in said pilot circuit mounted in heat exchange relationship to said second and third bimetal members.

9. A control apparatus as defined in claim 8, in which said second bimetal member is interconnected with the supported cooking vessel position through a member of poor heat conductivity.

10. In control apparatus for the energization of a cooking range, the combination comprising a support for a cooking vessel, an energy-supplying heating unit for the vessel mounted on said support, a switch mounted beneath the supported position of a cooking vessel in heat-exchange relationship therewith for sensing the temperature to which the vessel is heated by said unit, said switch comprising a pair of elongated bimetallic members each having one end supported by a heat-conducting member positioned to be in thermal association with the cooking vessel in such manner that the first bimetallic member mounted in good heat conductivity relationship to said heat conducting member responds quickly to heat transmitted from the cooking vessel and the second bimetallic member mounted in poor heat conducting relationship to said heat conducting member responds slowly to said heat, contacts controlled by said bimetallic members respectively to be movable into and out of engagement with each other, said first bimetallic member being movable toward contact closing position when heated and said second bimetallic member being movable toward contact opening position when heated, an electrical resistance heater in heat exchange relationship with said second bimetallic member connected in series with said contacts whereby said heater is energized when the contacts close and is deenergized when the contact open, and remotely located means controlled by said contacts for controlling said heating unit.

References Cited in the file of this patent

UNITED STATES PATENTS

| | | |
|---|---|---|
| 1,697,040 | Appelberg | Jan. 1, 1929 |
| 1,718,748 | Marshall | June 25, 1929 |
| 2,399,423 | Bletz | Apr. 30, 1946 |
| 2,427,945 | Clark et al. | Sept. 23, 1947 |
| 2,510,038 | Rudahl | May 30, 1950 |
| 2,510,040 | Rudahl | May 30, 1950 |
| 2,727,973 | Collins | Dec. 20, 1955 |
| 2,999,144 | Carissimi | Sept. 5, 1961 |